US009589713B2

(12) United States Patent
Murakawa et al.

(10) Patent No.: US 9,589,713 B2
(45) Date of Patent: Mar. 7, 2017

(54) SINTERED FERRITE MAGNET AND MOTOR PROVIDED THEREWITH (71) Applicant: TDK CORPORATION, Tokyo (JP)

(72) Inventors: Yoshitaka Murakawa, Tokyo (JP); Naoharu Tanigawa, Tokyo (JP); Yoshihiko Minachi, Tokyo (JP); Hitoshi Taguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 222 days.

(21) Appl. No.: 14/638,635

(22) Filed: Mar. 4, 2015

(65) Prior Publication Data

US 2015/0255197 A1    Sep. 10, 2015

(30) Foreign Application Priority Data

Mar. 7, 2014 (JP) ................... 2014-045446
Jan. 29, 2015 (JP) ................... 2015-015810

(51) Int. Cl.
*H01F 1/11* (2006.01)
*H01F 1/03* (2006.01)
*H02K 1/02* (2006.01)
*C04B 35/26* (2006.01)
*C04B 35/626* (2006.01)
*C01G 49/00* (2006.01)

(52) U.S. Cl.
CPC ....... *H01F 1/0315* (2013.01); *C01G 49/0036* (2013.01); *C04B 35/26* (2013.01); *C04B 35/62685* (2013.01); *H01F 1/11* (2013.01); *H02K 1/02* (2013.01); *C01P 2004/61* (2013.01); *C01P 2004/62* (2013.01); *C01P 2006/12* (2013.01); *C04B 2235/3201* (2013.01); *C04B 2235/3208* (2013.01); *C04B 2235/3213* (2013.01); *C04B 2235/3215* (2013.01); *C04B 2235/3217* (2013.01); *C04B 2235/3227* (2013.01); *C04B 2235/3241* (2013.01); *C04B 2235/3262* (2013.01); *C04B 2235/3275* (2013.01); *C04B 2235/3284* (2013.01); *C04B 2235/3418* (2013.01); *C04B 2235/5409* (2013.01); *C04B 2235/605* (2013.01); *C04B 2235/72* (2013.01); *C04B 2235/767* (2013.01); *C04B 2235/785* (2013.01); *C04B 2235/96* (2013.01)

(58) Field of Classification Search
CPC ...... H01F 1/0315; H01K 1/02; C04B 35/2683
See application file for complete search history.

(56) References Cited

U.S. PATENT DOCUMENTS

2012/0229354 A1    9/2012  Ishikura et al.

FOREIGN PATENT DOCUMENTS

| EP | 1808422 A1 | 7/2007 |
| JP | H11-154604 A | 6/1999 |
| JP | H11-251126 A | 9/1999 |
| JP | 2001-052912 A | 2/2001 |
| JP | 2001-076919 A | 3/2001 |
| JP | 2001-284113 | * 10/2001 |
| JP | 2001-284113 A | 10/2001 |
| JP | 2012-190920 A | 10/2012 |

OTHER PUBLICATIONS

Translation of JP 2001-284113, Oct. 2001.*

* cited by examiner

*Primary Examiner* — Carol M Koslow
(74) *Attorney, Agent, or Firm* — Oliff PLC (57) ABSTRACT A sintered ferrite magnet comprises a main phase of an M type Sr ferrite having a hexagonal crystal structure. An amount of Zn is 0.05 to 1.35 mass % in terms of ZnO, the sintered ferrite magnet does not substantially include a rare-earth element (R), and the following Formula (1) is satisfied, where a total amount of Sr, Ba and Ca is M3 in terms of mol, a total amount of Fe, Co, Mn, Zn, Cr and Al is M4 in terms of mol, and an amount of Si is M5 in terms of mol.

$$0.5 \leq \{M3-(M4/12)\}/M5 \leq 4.8 \qquad (1).$$

7 Claims, 3 Drawing Sheets

SINTERED FERRITE MAGNET AND MOTOR PROVIDED THEREWITH

BACKGROUND OF THE INVENTION

1. Field of the Invention

The present invention relates to a sintered ferrite magnet and a motor provided therewith.

2. Description of the Related Art

As magnetic materials used in a sintered ferrite magnet, Ba ferrite, Sr ferrite, and Ca ferrite having a hexagonal crystal structure are known. Recently, among these magnetic materials, magnetoplumbite type (M type) Sr ferrite has been mainly employed as a magnet material for motors and the like. The M type ferrite is expressed by General Formula of $AFe_{12}O_{19}$, for example. The Sr ferrite has Sr at an A site of the crystal structure.

As the M type Sr ferrite, Sr ferrite containing a component of Ca and Si has been widely used. Such a Sr ferrite has a tendency that when Ca is increased, squareness ratio (Hk/HcJ) is decreased while residual magnetic flux density (Br) is improved. Such a Sr ferrite also has a tendency that when Si is increased, residual magnetic flux density (Br) is decreased while squareness ratio (Hk/HcJ) is improved. Thus, there is a limit to magnetic characteristics to be obtained.

Therefore, it has been attempted to improve magnetic characteristics. For example, Patent Literature 1 discloses a technique for improving magnetic characteristics by substituting parts of an A-site element and a B-site element with a specific amount of a rare-earth element and Co.

In addition, as a technique for improving magnetic characteristics, in the Sr ferrite, a technique for including Zn and Ti (Patent Literature 2), a technique for including Zn and Mn (Patent Literatures 3 and 4) and the like are proposed.

[Patent Literature 1] JP Patent Application Laid Open No. H11-154604

[Patent Literature 2] JP Patent Application Laid Open No. 2001-052912

[Patent Literature 3] JP Patent Application Laid Open No. H11-251126

[Patent Literature 4] JP Patent Application Laid Open No. 2001-284113

SUMMARY OF THE INVENTION

However, the above techniques are required to use more expensive components than a main source material of such as Fe and Sr, and thus there is a problem that cost of the source material is increased compared with conventional Sr ferrite. For example, since components such as La (rare-earth element) and Co have been particularly soaring in recent years, they are remarkably expensive compared with the main source material of such as Fe and Sr. Ti is also expensive compared with the main source material of such as Fe and Sr, and thus cost of the source material cannot be sufficiently reduced. Then, production cost (especially costs of the source material) is required to be reduced.

As a representative use of the sintered ferrite magnet, a motor may be exemplified. The sintered ferrite magnet used in a motor is demanded to be excellent in both characteristics of residual magnetic flux density (Br) and squareness ratio (Hk/HcJ). However, it is generally known that the residual magnetic flux density (Br) and the squareness ratio (Hk/HcJ) are in a trade-off relationship. Therefore, it has been demanded to establish a technology capable of further improving both characteristics of the residual magnetic flux density (Br) and the squareness ratio (Hk/HcJ).

The invention has been made in consideration of the above-described circumstances, and an object thereof is to provide a sintered ferrite magnet which is excellent in a residual magnetic flux density (Br) and a squareness ratio (Hk/HcJ), and a motor provided therewith.

The gist of the invention for solving such a problem is as below.

[1] A sintered ferrite magnet comprising a main phase of an M type Sr ferrite having a hexagonal crystal structure, wherein an amount of Zn is 0.05 to 1.35 mass % in terms of ZnO, the sintered ferrite magnet does not substantially include a rare-earth element (R), and the following Formula (1) is satisfied, where a total amount of Sr, Ba and Ca is M3 in terms of mol, a total amount of Fe, Co, Mn, Zn, Cr and Al is M4 in terms of mol, and an amount of Si is M5 in terms of mol.

$$0.5 \leq \{M3-(M4/12)\}/M5 \leq 4.8 \quad (1)$$

[2] The sintered ferrite magnet as set forth in [1], wherein
an amount of Mn is less than 0.5 mass % in terms of MnO.

[3] The sintered ferrite magnet as set forth in [1] or [2], wherein
an amount of Na is 0.01 to 0.09 mass % in terms of $Na_2O$.

[4] The sintered ferrite magnet as set forth in any one of [1] to [3], wherein
an average grain size of crystal grains of the Sr ferrite is 1.0 μm or less and
a ratio of the crystal grains having a grain size of 2.0 μm or more is 2% or less on the number basis.

[5] The sintered ferrite magnet as set forth in any one of [1] to [4], wherein
a residual magnetic flux density (Br) is 440 mT or more and
a squareness ratio (Hk/HcJ) is 85% or more.

[6] A motor, comprising:
the sintered ferrite magnet according to any one of [1] to [5].

Advantageous Effects of Invention

According to the present invention, it is possible to obtain a sintered ferrite magnet having high residual magnetic flux density (Br) and squareness ratio (Hk/HcJ).

DESCRIPTION OF THE PREFERRED EMBODIMENTS

Hereinafter, a preferred embodiment of invention will be described in detail with reference to the attached drawings as necessary.

Figure 1:
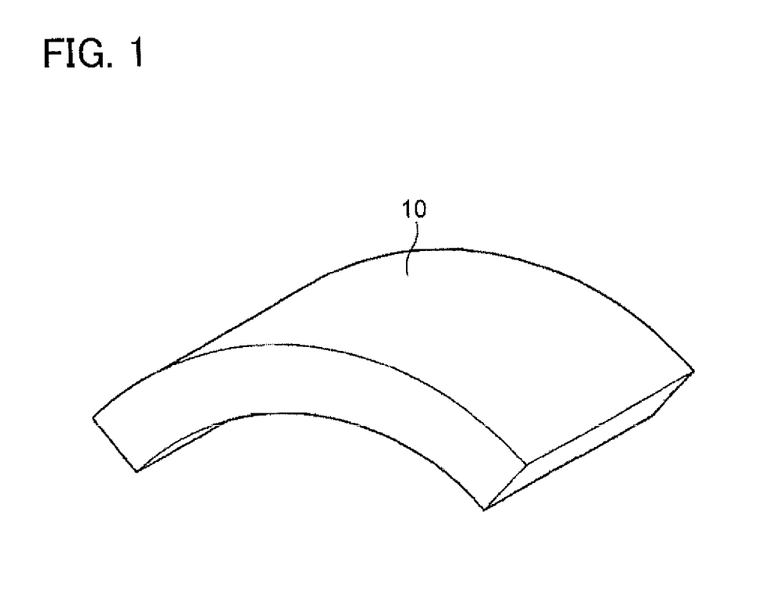
FIG. 1 is a perspective view schematically illustrating a preferred embodiment of a sintered ferrite magnet of the invention.

FIG. 1 is a perspective view schematically illustrating a sintered ferrite magnet of this embodiment. A sintered ferrite magnet 10 has a curved shape to have an end face of an arc shape, and has a shape generally called an arc segment shape, a C shape, a roof tile shape, or a bow shape. For example, the sintered ferrite magnet 10 is suitably used as a magnet for motors.

The sintered ferrite magnet 10 contains crystal grains of M type Sr ferrite having a hexagonal structure as a main component (main phase).

For example, such a M type Sr ferrite can be expressed by the following Formula (2).

$$SrFe_{12}O_{19} \quad (2)$$

In the M-type Sr ferrite of Formula (2), parts of A-site Sr and B-site Fe may be substituted with an impurity or an intentionally added element.

Such a M type Sr ferrite can be expressed by the following General Formula (3).

$$Sr(Fe_{12-x}M_x)_yO_{19} \quad (3)$$

In Formula (3), for example, x ranges from 0.01 to 0.5, and y ranges from 0.7 to 1.2. For example, M in Formula (2) represents one or more kinds of elements selected from the group consisting of Zn (zinc), Co (cobalt), Ni (nickel), Mn (manganese), Al (aluminum), and Cr (chromium).

Note that, a ratio between the A site and the B site and a ratio of oxygen (O) in Formulae (2) and (3) actually show values slightly biased from the above ranges. Thus, they may slightly deviate from the above values.

Preferably, the M type Sr ferrite in the sintered ferrite magnet 10 is expressed by Formula (3), and M includes at least Zn (zinc).

A ratio of a M type Sr ferrite phase in the sintered ferrite magnet 10 is preferably 90% or more, more preferably 95% or more, and still more preferably 97% or more. As described above, it is possible to further improve the magnetic characteristics by reducing a ratio of a crystal phase different from the M type Sr ferrite phase. The ratio (%) of the M type Sr ferrite phase in the sintered ferrite magnet 10 can be confirmed by obtaining an abundance ratio (mol %) of M phase by X-ray diffraction. The abundance ratio (mol %) of M phase is calculated by mixing each powder sample of M type ferrite, orthoferrite, hematite, spinel, and W type ferrite in a predetermined ratio, and comparing and calculating X-ray diffraction strength thereof.

As an accessory component, the sintered ferrite magnet 10 contains a component different from the M type Sr ferrite. A grain boundary component and a component present as a different phase are exemplified as the accessory component. Oxides are exemplified as such components. Specifically, as a constituent element, oxides and composite oxides which have at least one kind of elements selected from the group consisting of Na (sodium), Si (silicon), Ca (calcium), Sr (strontium), Ba (barium), Fe (iron), Co (cobalt), Mn (manganese), Zn (zinc), Cr (chrome), and Al (aluminum) are exemplified. As the oxides, $SiO_2$, $Na_2O$, $CaO$, $ZnO$, $Fe_2O_3$, and MnO etc. are exemplified. In addition, silicate glass may be contained.

An amount of Fe in the sintered ferrite magnet 10 is preferably 80 to 95 mass %, and more preferably 87 to 90 mass % in terms of $Fe_2O_3$. By setting the amount in the above range, favorable magnetic characteristics are obtained.

An amount of Sr in the sintered ferrite magnet 10 is preferably 9 to 11 mass %, and more preferably 9 to 10 mass % in terms of SrO. By setting the amount in the above range, favorable magnetic characteristics are obtained.

An amount of Zn in the sintered ferrite magnet 10 is preferably 0.05 to 1.35 mass % in terms of ZnO. By satisfying the above range, it is possible to restrain generation of appearance inferiority, have a sufficient mechanical strength (especially, bending strength (a)), and favorably maintain magnetic characteristic (balance between residual magnetic flux density (Br) and squareness ratio (Hk/HcJ)).

From a viewpoint of further increasing residual magnetic flux density (Br) of the sintered ferrite magnet 10, an amount of Zn is preferably 0.10 mass % or more, and more preferably 0.14 mass % or more in terms of ZnO. From a viewpoint of further increasing squareness ratio (Hk/HcJ) of the sintered ferrite magnet 10, an amount of Zn is preferably 0.76 mass % or less, and more preferably 0.37 mass % or less in terms of ZnO.

From a viewpoint of further increasing mechanical strength of the sintered ferrite magnet 10, an amount of Zn is preferably 0.10 mass % or more, and more preferably 0.20 mass % or more in terms of ZnO. By increasing the amount of Zn, it is considered that sintering density is improved and mechanical strength of the sintered ferrite magnet 10 is accordingly improved. Note that, although it is not necessarily clear how sintering density is improved in accordance with the increase of the amount of Zn, it is presumed that an ideal densification is proceeded by the fact that, in addition to Zn which is solid-solute into a crystal lattice at the time of sintering, a part of Zn is formed in a liquid phase with other component (such as Si or Ca) in a grain boundary.

Further, the sintered ferrite magnet 10 does not substantially include a rare-earth element (R). For example, the rare-earth element (R) represents one or more kinds of elements selected from the group consisting of La (lanthanum), Ce (cerium), Pr (praseodymium), Nd (neodymium), and Sm (samarium).

In terms of a R—Zn Sr ferrite, it is conventionally general to add R (e.g., La) having moles equal to Zn from a viewpoint of charge compensation.

However, the present inventors have found that excellent magnetic characteristics can be obtained by adding a small amount of Zn without including R. The reason thereof is not necessarily clear, but it is considered that a minute oxygen defect or so expected to be present in crystal grains of Sr ferrite particles helps charge compensation when a small amount of Zn is solid-solute into a Fe site. This makes it possible to cheaply obtain a sintered ferrite magnet having excellent magnetic characteristics without using an expensive component like R.

Note that, in this embodiment, the term "substantially not include R" means that a component including R is not intentionally added as a source material. Thus, a minute amount of R contained as unavoidable impurities (unavoidable components derived from impurities contained in source materials or a manufacturing facility) is acceptable, and an amount of R is preferably less than 0.005 mass %, and more preferably less than 0.001 mass % in terms of oxide.

The sintered ferrite magnet 10 preferably contains one kind or more selected from Mn (manganese), Na (sodium), Si (silicon), and Ca (calcium).

An amount of Mn in the sintered ferrite magnet 10 is preferably less than 0.5 mass %, and more preferably 0.3 mass % or less in terms of MnO. By satisfying the above range, magnetic characteristics (especially, residual magnetic flux density (Br)) can be favorably maintained. Note that, an amount of Mn may be 0 mass % in terms of MnO.

An amount of Na in the sintered ferrite magnet 10 is preferably 0.01 to 0.09 mass % in terms of $Na_2O$. When the amount of Na is too small, a sintering temperature cannot be lowered, and sufficiently high magnetic characteristics tend to be hard to obtain because grain growth of crystal grains occurs. Thus, the amount of Na is preferably 0.01 mass % or more, more preferably 0.02 mass % or more, and still more preferably 0.04 mass % or more in terms of $Na_2O$. On the other hand, when the amount of Na is too large, a white powder tends to be generated on a surface of the sintered ferrite magnet 10. When the powder is generated on the surface of the sintered ferrite magnet 10, for example, adhesion between a motor member and the sintered ferrite magnet 10 decreases, and thus the sintered ferrite magnet 10 may be peeled from the motor member. That is, the reliability of the sintered ferrite magnet 10 deteriorates. Thus, the amount of Na is preferably 0.09 mass % or less, more preferably 0.08 mass % or less, and still more preferably 0.07 mass % or less in terms of $Na_2O$.

An amount of Si in the sintered ferrite magnet 10 is preferably 0.05 to 2 mass %, and more preferably 0.2 to 1 mass % in terms of $SiO_2$. By satisfying the above range, an excessive grain growth is prevented, and excellent magnetic characteristics can be achieved.

An amount of Ca in the sintered ferrite magnet 10 is preferably 0.05 to 2 mass %, and more preferably 0.1 to 0.8 mass % in terms of CaO. By satisfying the above range, an uniform densification can be realized, and excellent magnetic characteristics can be achieved.

The sintered ferrite magnet 10 may contain Ba. An amount of Ba in the sintered ferrite magnet 10 is preferably, for example, 0.01 to 2 mass % in terms of BaO.

The sintered ferrite magnet 10 may contain Al and/or Cr. AT and/or Cr have an effect of improving coercive force (HcJ). On the other hand, Al and/or Cr tend to decrease residual magnetic flux density (Br). Thus, a total amount of Al and Cr is preferably 3.0 mass % or less in terms of $Al_2O_3$ and $Cr_2O_3$. Note that, from a viewpoint of sufficiently demonstrating an effect of addition of Al and Cr, the total amount of Al and Cr is preferably 0.01 mass % or more in terms of $Al_2O_3$ and $Cr_2O_3$.

In addition to these components, the sintered ferrite magnet 10 may contain impurities contained in a source material or may contain unavoidable components derived from a manufacturing facility. Each oxide of such as Mg (magnesium), Ti (titanium), Mn (manganese), Mo (molybdenum), V (vanadium), and the like is exemplified as examples of the impurities and the unavoidable components.

The accessory component is mainly contained in a grain boundary of crystal grains of the Sr ferrite in the sintered ferrite magnet 10. When a ratio of each element included in the accessory component varies, a composition of the grain boundary varies. As a result, this variation may have an effect on the magnetic characteristics and the reliability of the sintered ferrite magnet 10. Thus, in the sintered ferrite magnet 10, excellent magnetic characteristics and a high reliability are demonstrated by adjusting a ratio of specific elements considered to be contained in the accessory component within a predetermined range.

That is, from a viewpoint of further improving magnetic characteristics and reliability, a grain boundary component ratio expressed by a molar ratio $\alpha=\{M3-(M4/12)\}/M5$ satisfies the following Formula (1).

$$0.5 \leq \{M3-(M4/12)\}/M5 \leq 4.8 \quad (1)$$

In Formula (1), M3 is a total amount (mol %) of Sr, Ba, and Ca, M4 is a total amount (mol %) of Fe, Co, Mn, Zn, Cr, and Al, and M5 is an amount (mol %) of Si.

Note that, the total amount (mol %) of Sr, Ba, and Ca of M3 may not include an amount (mol %) of one or more elements of Sr, Ba, and Ca that are failed to be detected during measurement. Also, note that, the total amount (mol %) of Fe, Co, Mn, Zn, Cr, and Al of M4 may not include an amount (mol %) of one or more elements of Fe, Co, Mn, Zn, Cr, and Al that are failed to be detected during measurement.

Formula (1) is established when it is considered that, in terms of accessory components containing impurities, Ba and Ca are mainly solid-solute into Sr site, and that Co, Mn, Zn, Cr, and Al are mainly solid-solute into Fe site. When the molar ratio cc is within a predetermined range, liquid phases of the respective accessory components are formed mainly based on Si, and a sufficient densification, restraint of grain growth, and uniform solid solution of the respective accessory components can be achieved. As a result, it is considered that the sintered ferrite magnet 10 demonstrates excellent magnetic characteristics and a high mechanical strength.

On the other hand, when the molar ratio $\alpha$ is too small, densification is insufficient, and residual magnetic flux density (Br) and mechanical strength (especially, bending strength ($\sigma$)) tend to decrease. Thus, the molar ratio $\alpha$ in the sintered ferrite magnet 10 is 0.5 or more, preferably 0.6 or more, and more preferably 0.8 or more. When the molar ratio $\alpha$ is too large, there is a tendency that an effect of restraining grain growth cannot be sufficiently obtained, particle size becomes uneven, and squareness ratio (Hk/HcJ) decreases. Thus, the molar ratio $\alpha$ in the sintered ferrite magnet 10 is 4.8 or less, preferably 4.0 or less, more preferably 3.4 or less, and still more preferably 2.6 or less.

In addition, the amount of the respective components of the sintered ferrite magnet 10 can be measured by fluorescent X-ray analysis and inductively coupled plasma emission spectroscopic analysis (ICP analysis).

An average grain size of crystal grains of the Sr ferrite in the sintered ferrite magnet 10 is preferably 2.0 µm or less, more preferably 1.0 µm or less, and still more preferably 0.3 to 1.0 µm. When the average grain size of crystal grains of the Sr ferrite exceeds 2.0 µm, sufficiently excellent magnetic characteristics tend to be hard to obtain. On the other hand, it tends to be difficult to manufacture (produce) a sintered ferrite magnet in which the average grain size of crystal grains of the Sr ferrite is less than 0.3 µm.

Grain sizes of crystal grains of the Sr ferrite contained in the sintered ferrite magnet 10 preferably have a small deviation. Specifically, a ratio of crystal grains having a grain size of 2.0 µm or more to the entirety of crystal grains of the Sr ferrite is preferably 2% or less, and more preferably 1% or less on the number basis. Uniformity of crystal grains of the Sr ferrite is improved, which improves reliability while further increasing high magnetic characteristics.

A number average value (average aspect ratio) of aspect ratios of crystal grains of the Sr ferrite contained in the sintered ferrite magnet 10 is preferably approximately 1.0. This allows the sintered ferrite magnet 10 to have sufficiently high magnetic characteristics.

Grain sizes of crystal grains of the Sr ferrite in the sintered ferrite magnet 10 can be measured by the following procedure. Samples cut from a sintered ferrite magnet are made thinner and observed by TEM. Alternatively, cross sections of the samples are mirror-polished, the cross sections are etched with an acid such as hydrofluoric acid, and then the resultant etched surfaces are observed by SEM or so. In a SEM or TEM observation image including several hundreds of crystal grains, after the contours of the crystal grains are made clear, image processing or so is performed to measure a grain size distribution of an a-plane. "Grain size" in this specification represents the major axis (diameter in an a-axis direction) in an a-plane. In addition, when the maximum diameter passing the center of gravity is set as the major axis and the minimum diameter passing the center of gravity is set as the minor axis, a ratio of the major axis to the minor axis is an "aspect ratio". Note that, a so-called thermal etching, where samples are heated and etched, may be performed instead of the etching with the acid.

From the measured grain size distribution on the number basis, an average value of the grain size of crystal grains is calculated on the number basis. In addition, a standard deviation is calculated from the measured grain size distribution and average value. In this specification, the average value and the grain size distribution are set as an average grain size of crystal grains of the Sr ferrite and a standard deviation thereof.

A residual magnetic flux density (Br) of the sintered ferrite magnet 10 is preferably 440 mT or more, more preferably 445 mT or more, and still more preferably 450 mT or more. A squareness ratio (Hk/HcJ) of the sintered ferrite magnet 10 is preferably 85% or more, more preferably 87% or more, and still more preferably 90% or more. In particular, the sintered ferrite magnet 10 preferably has a residual magnetic flux density (Br) of 440 mT or more and a squareness ratio (Hk/HcJ) of 85% or more. By having such excellent magnetic characteristics, the sintered ferrite magnet 10 can be more favorably applied to motors and generators.

The sintered ferrite magnet 10 has a sufficient mechanical strength. A bending strength ($\sigma$) measured by three-point bending test is preferably 150 N/mm$^2$ or more, more preferably 155 N/mm$^2$ or more, and still more preferably 160 N/mm$^2$ or more. The sintered ferrite magnet 10 having a high mechanical strength is easily handled and can be effectively prevented from breaking or cracking during transportation. Thus, the manufacturing yield is improved, which contributes to cost reduction. Further, the sintered ferrite magnet 10 having a high mechanical strength is not easily broken even after it is assembled in a product such as a motor, thus product reliability can be improved.

Note that, in order that squareness ratio (Hk/HcJ) is 87% or more while favorably maintaining residual magnetic flux density (Br) and bending strength ($\sigma$) of the sintered ferrite magnet 10 (Br$\geq$440 mT, $\sigma\geq$150 N/mm$^2$), it is preferred that an amount of Zn be 0.05 to 0.76 mass % in terms of ZnO, $\alpha$ be 0.50 to 2.54, and further an amount of Na be 0.08 mass % or less in term's of Na$_2$O.

Further, in order that squareness ratio (Hk/HcJ) of the sintered ferrite magnet 10 is 90% or more, it is preferred that an amount of Zn be 0.05 to 0.37 mass % in terms of ZnO, $\alpha$ be 0.50 to 1.15, and further an amount of Na be 0.08 mass % or less in terms of Na$_2$O.

In order that bending strength ($\sigma$) is 155 N/mm$^2$ or more while favorably maintaining residual magnetic flux density (Br) and squareness ratio (Hk/HcJ) of the sintered ferrite magnet 10 (Br$\geq$440 mT, Hk/HcJ$\geq$85%), it is preferred that an amount of Zn be 0.10 to 1.35 mass % in terms of ZnO and $\alpha$ be 0.59 to 4.80.

In order that bending strength ($\sigma$) of the sintered ferrite magnet 10 is 160 N/mm$^2$ or more, it is preferred that an amount of Zn be 0.20 to 1.35 mass % in terms of ZnO, $\alpha$ be 0.68 to 4.80, and an amount of Mn be 0.30 mass % or less in terms of MnO.

For example, the sintered ferrite magnet 10 may be used as a magnet of motors for vehicles such as motors for a fuel pump, a power window, an anti-lock brake system (ABS), a fan, a wiper, power steering, an active suspension, a starter, a door lock, and an electric mirror. In addition, the sintered ferrite magnet 10 may also be used as a magnet of motors for OA/AV apparatuses such as motors for an FDD spindle, a VTR capstan, a VTR rotary head, a VTR reel, VTR loading, a VTR camera capstan, a VTR camera rotary head, VTR camera zooming, VTR camera focusing, a radio cassette recorder capstan, a CD/DVD/MD spindle, CD/DVD/MD loading, and CD/DVD optical pickup. Furthermore, the sintered ferrite magnet 10 may also be used as a magnet of motors for household electrical appliances such as motors for a compressor of an air-conditioner, a compressor of a freezer, electric tool driving, a drier fan, shaver driving, and an electric toothbrush. Furthermore, the sintered ferrite magnet 10 may also be used as a magnet of motors for FA apparatuses such as motors for driving of a robot shaft and a joint, main driving of a robot, driving of a machine tool table, and driving of a machine tool belt.

The sintered ferrite magnet 10 is bonded to the above-described motor member and is provided inside the motor. The sintered ferrite magnet 10 having excellent magnetic characteristics is bonded to the motor member in a sufficiently strong manner because crack and foreign matter (white powder) on a surface are sufficiently restrained from occurring. As described above, the sintered ferrite magnet 10 can be sufficiently restrained from being peeled from the motor member. Accordingly, various motors provided with the sintered ferrite magnet 10 have both high efficiency and high reliability.

The sintered ferrite magnet 10 is not limited to be used for the motors, and may be used, for example, as a member such as a generator, a magnet for speakers and headphones, a magnetron tube, a magnetic field generating apparatus for an MRI, a clamper for a CD-ROM, a sensor for a distributor, a sensor for an ABS, a fuel and oil level sensor, a magnet latch, and an isolator. In addition, the sintered ferrite magnet 10 may be used as a target (pellet) during formation of a magnetic layer of a magnetic recording medium by a deposition method, a sputtering method, and the like.

Next, a method for manufacturing the sintered ferrite magnet 10 will be described. The method for manufacturing the sintered ferrite magnet 10 includes a blending process, a calcination process, a pulverization process, a molding process in a magnetic field, and a firing process. Hereinafter, the respective processes will be described in detail.

The blending process is a process of preparing a mixed powder for calcination. In the blending process, first, starting source materials are weighed and blended in a predetermined ratio. Then, they are mixed with a wet-type attritor, a ball mill, and the like for 1 hour to 20 hours. Pulverization is also performed during the mixing. As the starting source materials, compounds having constituent elements of the Sr ferrite that is a main component are prepared.

In the blending process, powders such as SiO$_2$, CaCO$_3$, Na$_2$CO$_3$, and ZnO may be added. As a compound having a constituent element of Na, a silicate or an organic compound (dispersing agent or so) containing Na may be used in addition to a carbonate. A compound having Zn as a constituent element is not limited to oxides, but can be appropriately selected from inorganic zinc and organic zinc compound.

As the compounds having the constituent elements of the Sr ferrite, oxides or compounds such as carbonates, hydroxides and nitrites to be oxides by firing may be used. SrCO$_3$, Fe₂O₃ and the like are exemplified as the compounds. An average particle size of the starting source materials is not particularly limited, and is 0.1 µm to 2.0 µm, for example. It is not necessary to mix all of the starting source materials in the blending process before the calcination, and a part or all of the respective compounds may be added after the calcination.

The calcination process is a process of calcinating the source material composition obtained in the blending process. The calcination can be performed in an oxidizing atmosphere such as in the air. A calcination temperature is preferably 800° C. to 1450° C., more preferably 850° C. to 1300° C., and still more preferably 900° C. to 1200° C. A calcination time at the calcination temperature is preferably 1 second to 10 hours, and more preferably 1 minute to 3 hours. An amount of the Sr ferrite in a calcined material obtained by the calcination is preferably 70 mass % or more, and more preferably 90 mass % or more. A primary particle size of the calcined material is preferably 10 µm or less, and more preferably 2.0 µm or less.

The pulverization process is a process of pulverizing the calcined material to obtain a powder of a ferrite magnet. The pulverization process may be performed in a single step, or in two steps divided into a rough pulverization process and a fine pulverization process. Typically, the calcined material is present in a granular shape or an agglomerated shape and thus it is preferable to perform the rough pulverization process at first. In the rough pulverization process, pulverization is performed in a dry type by using a vibration rod mill and the like to prepare a pulverized powder having an average particle size of 0.5 µm to 5.0 µm. The pulverized powder prepared in this manner is wet-pulverized by using a wet-type attritor, a ball mill, a jet mill, and the like to obtain a fine powder having an average particle size of 0.08 µm to 2.0 µm, preferably 0.1 µm to 1.0 µm, and more preferably 0.2 µm to 0.8 µm.

A specific surface area of the fine powder in accordance with a BET method is preferably 5 to 14 m²/g, and more preferably 7 to 12 m²/g. For example, in a case of using the wet-type attritor, a pulverization time is 30 minutes to 20 hours, and in a case of using the ball mill, the pulverization time is 5 to 50 hours. It is preferred that the pulverization time be appropriately adjusted in accordance with a pulverization method.

In the pulverization process, in addition to powders such as SiO₂, Na₂CO₃, and ZnO, powders of such as CaCO₃, SrCO₃, and BaCO₃ may be added. As a compound having a constituent element of Na, a silicate or an organic compound (such as dispersing agent) containing Na may be used in addition to a carbonate. A compound containing Zn as a constituent element is not limited to oxides, and can be appropriately selected from inorganic zinc and organic zinc compound.

When adding the components, sinterability and magnetic characteristics can be improved. Note that, the components may flow out together with a solvent of slurry in a case of performing wet molding, and thus the components are preferably blended in an amount more than a target amount in a sintered ferrite magnet.

In order to increase a magnetic orientation degree of the sintered ferrite magnet, it is preferable to add polyhydric alcohol in the fine pulverization process in addition to the above-described component. An added amount of the polyhydric alcohol is 0.05 to 5.0 mass %, preferably 0.1 to 3.0 mass %, and more preferably 0.1 to 2.0 mass % with respect to materials to be added. Note that, the added polyhydric alcohol is removed by thermal decomposition in the firing process after the molding process in a magnetic field.

The molding process in a magnetic field is a process of molding the fine powder obtained in the pulverization process in a magnetic field to prepare a molded body. The molding process in a magnetic field may be performed by either dry molding or wet molding. However, the wet molding is preferable from the viewpoint of increasing the magnetic orientation degree. In a case of performing the wet molding, the slurry obtained by performing the fine pulverization process in a wet manner may be adjusted to have a predetermined concentration, and the slurry may be set as slurry for wet molding. Concentration of the slurry may be performed by centrifugal separation, filter pressing and the like.

An amount of the fine powder in the slurry for wet molding is preferably 30 to 85 mass %. Water or nonaqueous solvent may be used as a dispersion medium of the slurry. In addition to water, surfactants such as gluconic acid, gluconate, and sorbitol may be added to the slurry for wet molding. The molding in a magnetic field is performed by using the slurry for wet molding. A molding pressure is, for example, 0.1 to 0.5 ton/cm², and an applied magnetic field is, for example, 5 to 15 kOe.

The firing process is a process of firing the molded body to obtain a sintered body. The firing process is typically performed in an oxidizing atmosphere such as in the air. A firing temperature is preferably 1050 to 1300° C., and more preferably 1150 to 1250° C. A firing time at the firing temperature is preferably 0.5 to 3 hours. Through the above-described processes, it is possible to obtain a sintered body, that is, a sintered ferrite magnet 10. In addition, the method for manufacturing the sintered ferrite magnet of the invention is not limited to the above-described method.

Hereinbefore, a preferred embodiment of the invention has been described, but the sintered ferrite magnet and the motor of the invention are not limited to the above-described sintered ferrite magnet and motor. For example, the shape of the sintered ferrite magnet is not limited to the shape in FIG. 1, and may be appropriately modified into a shape that is suitable for the above-described uses.

EXAMPLES

Hereinafter, the contents of the invention will be described in more detail with reference to Examples and Comparative Examples, but the invention is not limited to the following Examples.

(Preparation of Sintered Ferrite Magnet)

First, the following starting source materials were prepared.

Fe₂O₃ powder (primary particle size: 0.3 µm)
SrCO₃ powder (primary particle size: 2 µm)
SiO₂ powder (primary particle size: 0.01 µm)
CaCO₃ powder
MnO powder
ZnO powder
Na₂CO₃ powder Example 1

1000 g of Fe₂O₃ powder, 161.2 g of SrCO₃ powder, and 2.3 g of SiO₂ powder were mixed while pulverizing the powders by using a wet attritor, and then drying and granulation were performed. The resultant powder obtained in this manner was fired in the air at 1250° C. for 3 hours, and thereby a granular calcined material was obtained. The calcined material was roughly pulverized by using a dry vibration rod mill, and thereby a powder having a specific surface area of 1 m$^2$/g in accordance with a BET method was prepared.

Sorbitol, the SiO$_2$ powder, the ZnO powder, the MnO powder, and the CaCO$_3$ powder were added to 200 g of the roughly pulverized powder in a predetermined amount, and then wet pulverization was performed for 24 hours by using a ball mill to obtain slurry. An added amount of the sorbitol was 0.25 mass % on the basis of the mass of the roughly pulverized powder. The specific surface area of a fine powder after pulverization was 8 to 10 m$^2$/g.

The Na$_2$CO$_3$ powder was added to the slurry after completion of the pulverization in a predetermined amount, and then stirring was performed. Then, a concentration of a solid amount of the slurry was adjusted, and molding was performed by using a wet magnetic field molding machine in an applied magnetic field of 12 kOe to obtain a molded body. Three pieces of such molded bodies were prepared. The molded bodies were fired in the air at 1170° C., 1185° C., and 1200° C., respectively, and thereby three kinds of cylindrical sintered ferrite magnets having firing temperatures different from each other were obtained (Example 1).

Examples 2 to 40 and Comparative Examples 1 to 9

In addition, sintered ferrite magnets of Examples 2 to 40 and Comparative Examples 1 to 9 having a composition different from that of Example 1 were prepared in the same manner as Example 1 except that at least one of an added amount of the SrCO$_3$ powder before calcination, an added amount of the SiO$_2$ powder, the CaCO$_3$ powder, the ZnO powder and the MnO powder before wet pulverization, and an added amount of the Na$_2$CO$_3$ powder to the slurry was changed. In the respective Examples and Comparative Examples, three kinds of sintered ferrite magnets having firing temperatures different from each other were prepared.

(Evaluation of Sintered Ferrite Magnet)

<Composition Analysis>

The composition of the prepared sintered ferrite magnets of the respective Examples and Comparative Examples was measured by inductively coupled plasma emission spectroscopic analysis (ICP analysis). In the sintered ferrite magnets, elements (Ba and the like), which were derived from impurities contained in the starting source materials, were detected in addition to Fe, Sr, Si, Ca and the like.

Tables 1 and 2 show respective amounts of Fe, Sr, Ba, Al, Si, Ca, Mn, Zn, Cr, La, Co, and Na which were detected in terms of Fe$_2$O$_3$, SrO, BaO, Al$_2$O$_3$, SiO$_2$, CaO, MnO, ZnO, Cr$_2$O$_3$, La$_2$O$_3$, CoO, and Na$_2$O. Each of the amounts is a value (mass %) on the basis of the entirety of the sintered ferrite magnet.

Further, a molar ratio α was calculated on the assumption that Co, Mn, Zn, Cr and Al detected by the above-described composition analysis constituted a B site of the Sr ferrite expressed by General Formula (2) in combination with Fe, and that La, Ba and Ca constituted an A site of the Sr ferrite expressed by General Formula (2) in combination with Sr.

<Evaluation of Magnetic Characteristics>

An upper surface and a lower surface of each of the prepared cylindrical sintered ferrite magnets were processed, and then the magnetic characteristics were measured by using a B—H tracer whose maximum applied magnetic field was 25 kOe. During the measurement, residual magnetic flux density (Br) and coercive force (HcJ) were obtained, and an external magnetic field intensity (Hk) when reaching 90% of the residual magnetic flux density (Br) was measured. On the basis of the measured values, squareness ratio (Hk/HcJ) (%) was obtained. In the respective Examples and Comparative Examples, among the sintered ferrite magnets prepared at respective firing temperatures of 1170° C., 1185° C., and 1200° C., Tables 1 and 2 show magnetic characteristics of sintered ferrite magnets prepared at 1185° C. whose balance between residual magnetic flux density (Br) and coercive force (HcJ) was the best.

<Evaluation on External Appearance>

Each of the prepared ferrite magnets was left as it was in the air for 7 days, and the surface of the ferrite magnets was observed with the naked eye. Evaluation was performed on the basis of the following criteria. Evaluation results are shown in Tables 1 and 2.

A: Crack did not occur on a surface of a magnet thereon.
B: Crack occurred on a surface of a magnet.

<Evaluation on Mechanical Strength>

Bending strength (σ) was measured by three-point bending test under the following conditions.

Figure 2:
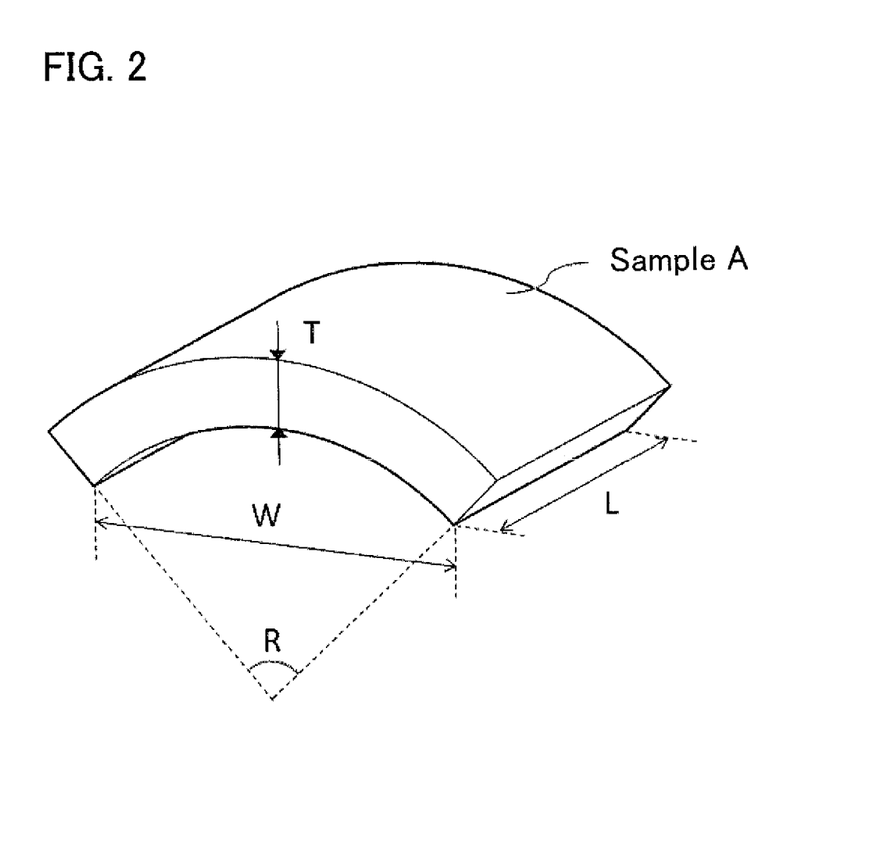
FIG. 2 is a perspective view schematically illustrating a sintered ferrite magnet (Sample A) in Examples and Comparative Examples of the invention.

First, apart from the cylindrical sintered ferrite magnets, an arc sintered ferrite magnet as shown in FIG. 2 (length L: 36 mm, width W: 29 mm, thickness T: 2.5 mm, and an angle R between tangents drawn from a center of a circle to both ends of an arc in a case of the circle including the arc: 78 degrees) was prepared (Sample A). Note that, a sintering temperature was 1185° C.

Figure 3:
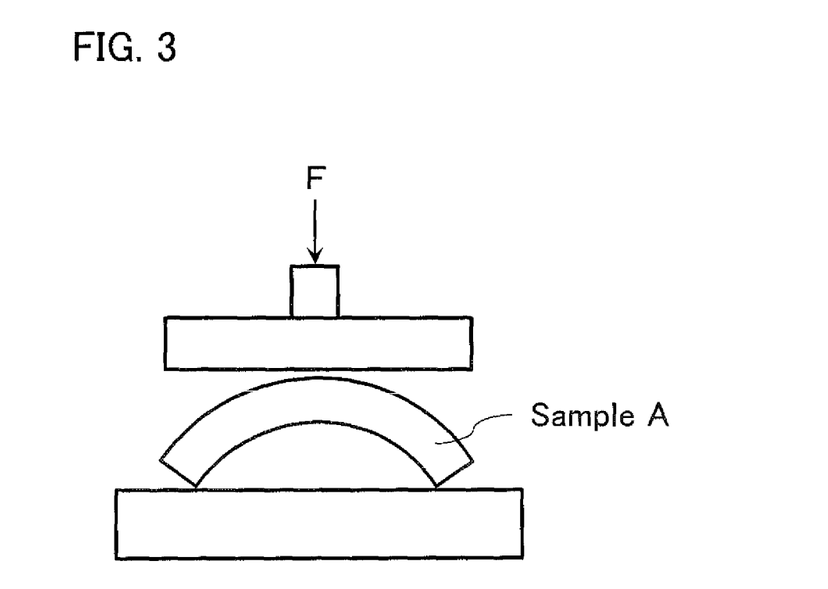
FIG. 3 is a view schematically illustrating a cross section at the time of measuring bending strength of a sintered ferrite magnet (Sample A) in Examples and Comparative Examples of the invention.

Next, the arc sintered ferrite magnet (Sample A) was placed on a horizontal stand as shown in FIG. 3, and Sample A was pressed from the above along the direction of the arrow (pressurization rate: 3 mm/min). Then, a maximum breaking load F [N] at the time of breaking of a sample was measured, and a bending strength (σ) was obtained by the following Formula (4). The results are shown in Tables 1 and 2. Note that, the bending strength (a) shown in Tables 1 and 2 was an average value of 30 samples.

$$\sigma[N/mm^2]=3\times L\times F/(2\times W\times T^2) \quad (4)$$

[Table 1]

TABLE 1

| | Oxide Composition | | | | | | | | |
|---|---|---|---|---|---|---|---|---|---|
| | Fe$_2$O$_3$ Mass % | SrO Mass % | BaO Mass % | Al$_2$O$_3$ Mass % | SiO$_2$ Mass % | CaO Mass % | MnO Mass % | ZnO Mass % | Cr$_2$O$_3$ Mass % |
| Comp. Ex. 1 | 89.10 | 9.62 | 0.07 | 0.09 | 0.42 | 0.34 | 0.26 | 0.00 | 0.07 |
| Comp. Ex. 2 | 89.07 | 9.64 | 0.07 | 0.08 | 0.41 | 0.34 | 0.26 | 0.03 | 0.06 |
| Example 1 | 89.06 | 9.63 | 0.07 | 0.08 | 0.41 | 0.34 | 0.26 | 0.05 | 0.06 |
| Example 2 | 88.97 | 9.65 | 0.07 | 0.09 | 0.43 | 0.33 | 0.25 | 0.10 | 0.07 |
| Example 3 | 88.95 | 9.62 | 0.07 | 0.09 | 0.42 | 0.34 | 0.25 | 0.14 | 0.07 |
| Example 4 | 88.91 | 9.61 | 0.07 | 0.09 | 0.40 | 0.32 | 0.26 | 0.18 | 0.07 |
| Example 5 | 88.89 | 9.63 | 0.07 | 0.09 | 0.41 | 0.33 | 0.25 | 0.20 | 0.08 |
| Example 6 | 88.80 | 9.60 | 0.07 | 0.09 | 0.41 | 0.34 | 0.25 | 0.29 | 0.08 |

TABLE 1-continued

| | Fe₂O₃ Mass % | SrO Mass % | BaO Mass % | Al₂O₃ Mass % | SiO₂ Mass % | CaO Mass % | MnO Mass % | ZnO Mass % | Cr₂O₃ Mass % | La₂O₃ Mass % | CoO Mass % | Na₂O Mass % | Molar Ratio α | Br mT | Hcl kA/m | Hk/Hcl % | Appearance | Strength σ N/mm² |
|---|---|---|---|---|---|---|---|---|---|---|---|---|---|---|---|---|---|---|
| Comp. Ex. 1 | | | | | | | | | | 0.00 | 0.01 | 0.02 | 0.83 | 437.5 | 335.8 | 91.9 | A | 100 |
| Comp. Ex. 2 | | | | | | | | | | 0.00 | 0.01 | 0.03 | 0.89 | 440.2 | 335.9 | 91.7 | A | 140 |
| Example 1 | | | | | | | | | | 0.00 | 0.02 | 0.02 | 0.87 | 440.4 | 337.9 | 91.6 | A | 153 |
| Example 2 | | | | | | | | | | 0.00 | 0.01 | 0.03 | 0.84 | 442.1 | 339.2 | 91.3 | A | 155 |
| Example 3 | | | | | | | | | | 0.00 | 0.01 | 0.04 | 0.84 | 445.2 | 327.5 | 91.4 | A | 156 |
| Example 4 | | | | | | | | | | 0.00 | 0.01 | 0.08 | 0.81 | 447.3 | 314.8 | 91.8 | A | 159 |
| Example 5 | | | | | | | | | | 0.00 | 0.01 | 0.04 | 0.84 | 447.8 | 312.2 | 92.0 | A | 160 |
| Example 6 | | | | | | | | | | 0.00 | 0.01 | 0.06 | 0.83 | 450.5 | 303.6 | 92.5 | A | 166 |
| Example 7 | 88.70 | 9.57 | 0.07 | 0.09 | 0.42 | 0.36 | 0.25 | 0.37 | 0.07 | 0.00 | 0.03 | 0.07 | 0.82 | 452.9 | 279.1 | 90.0 | A | 172 |
| Example 8 | 88.68 | 9.62 | 0.07 | 0.09 | 0.42 | 0.33 | 0.25 | 0.43 | 0.07 | 0.00 | 0.01 | 0.03 | 0.81 | 457.5 | 249.9 | 87.2 | A | 177 |
| Example 9 | 88.57 | 9.60 | 0.07 | 0.09 | 0.41 | 0.34 | 0.25 | 0.57 | 0.07 | 0.00 | 0.01 | 0.02 | 0.82 | 460.6 | 221.3 | 87.1 | A | 184 |
| Example 10 | 88.38 | 9.57 | 0.07 | 0.09 | 0.41 | 0.34 | 0.25 | 0.76 | 0.07 | 0.00 | 0.01 | 0.05 | 0.78 | 459.8 | 190.9 | 87.0 | A | 189 |
| Example 11 | 87.72 | 9.72 | 0.07 | 0.07 | 0.41 | 0.34 | 0.25 | 1.35 | 0.05 | 0.01 | 0.01 | 0.01 | 1.01 | 451.4 | 165.9 | 86.1 | A | 199 |
| Comp. Ex. 3 | 87.55 | 9.71 | 0.07 | 0.07 | 0.42 | 0.34 | 0.25 | 1.52 | 0.04 | 0.00 | 0.01 | 0.02 | 0.98 | 452.1 | 148.8 | 85.0 | B | 207 |
| Comp. Ex. 4 | 87.35 | 9.71 | 0.07 | 0.07 | 0.42 | 0.34 | 0.25 | 1.72 | 0.04 | 0.00 | 0.01 | 0.02 | 0.98 | 452.5 | 147.9 | 82.6 | B | 212 |
| Example 12 | 88.89 | 9.57 | 0.07 | 0.09 | 0.42 | 0.33 | 0.25 | 0.28 | 0.07 | 0.00 | 0.02 | 0.01 | 0.73 | 440.2 | 341.9 | 91.7 | A | 163 |
| Example 13 | 88.89 | 9.55 | 0.07 | 0.08 | 0.42 | 0.33 | 0.25 | 0.28 | 0.07 | 0.00 | 0.02 | 0.04 | 0.70 | 450.2 | 240.6 | 90.8 | A | 166 |
| Example 14 | 88.82 | 9.57 | 0.07 | 0.09 | 0.42 | 0.33 | 0.25 | 0.28 | 0.07 | 0.00 | 0.01 | 0.09 | 0.74 | 448.5 | 240.4 | 85.0 | A | 169 |
| Example 15 | 88.96 | 9.61 | 0.07 | 0.09 | 0.42 | 0.36 | 0.10 | 0.28 | 0.07 | 0.00 | 0.01 | 0.03 | 0.88 | 451.3 | 305.0 | 91.6 | A | 161 |
| Example 16 | 88.80 | 9.57 | 0.08 | 0.09 | 0.42 | 0.33 | 0.30 | 0.29 | 0.07 | 0.00 | 0.01 | 0.04 | 0.74 | 447.4 | 297.8 | 91.7 | A | 160 |
| Example 17 | 88.77 | 9.64 | 0.07 | 0.09 | 0.41 | 0.29 | 0.35 | 0.27 | 0.06 | 0.00 | 0.01 | 0.04 | 0.75 | 446.0 | 291.0 | 91.8 | A | 157 |
| Example 18 | 88.62 | 9.59 | 0.07 | 0.09 | 0.41 | 0.33 | 0.49 | 0.28 | 0.07 | 0.00 | 0.01 | 0.04 | 0.78 | 440.4 | 280.8 | 91.7 | A | 155 |

[Table 2]

TABLE 2

| | Fe₂O₃ Mass % | SrO Mass % | BaO Mass % | Al₂O₃ Mass % | SiO₂ Mass % | CaO Mass % | MnO Mass % | ZnO Mass % | Cr₂O₃ Mass % |
|---|---|---|---|---|---|---|---|---|---|
| Comp. Ex. 5 | 88.96 | 9.65 | 0.07 | 0.07 | 0.42 | 0.17 | 0.25 | 0.28 | 0.07 |
| Comp. Ex. 6 | 88.97 | 9.59 | 0.07 | 0.09 | 0.41 | 0.22 | 0.25 | 0.29 | 0.07 |
| Example 19 | 88.98 | 9.58 | 0.07 | 0.09 | 0.40 | 0.23 | 0.25 | 0.28 | 0.07 |
| Example 20 | 88.95 | 9.60 | 0.07 | 0.09 | 0.41 | 0.23 | 0.25 | 0.28 | 0.07 |
| Example 21 | 89.01 | 9.44 | 0.07 | 0.08 | 0.40 | 0.34 | 0.26 | 0.26 | 0.06 |
| Example 22 | 88.88 | 9.58 | 0.07 | 0.09 | 0.41 | 0.30 | 0.25 | 0.29 | 0.07 |
| Example 23 | 88.82 | 9.60 | 0.07 | 0.09 | 0.42 | 0.36 | 0.25 | 0.28 | 0.07 |
| Example 24 | 88.80 | 9.58 | 0.07 | 0.09 | 0.41 | 0.39 | 0.25 | 0.28 | 0.07 |
| Example 25 | 88.63 | 9.60 | 0.07 | 0.08 | 0.48 | 0.50 | 0.26 | 0.27 | 0.05 |
| Example 26 | 88.66 | 9.59 | 0.07 | 0.08 | 0.45 | 0.50 | 0.26 | 0.27 | 0.05 |
| Example 27 | 88.70 | 9.57 | 0.06 | 0.09 | 0.42 | 0.51 | 0.25 | 0.28 | 0.07 |
| Example 28 | 88.15 | 9.92 | 0.07 | 0.06 | 0.61 | 0.60 | 0.25 | 0.28 | 0.05 |
| Example 29 | 88.06 | 9.94 | 0.07 | 0.06 | 0.60 | 0.70 | 0.25 | 0.26 | 0.05 |
| Example 30 | 88.17 | 9.83 | 0.08 | 0.07 | 0.51 | 0.74 | 0.25 | 0.28 | 0.05 |
| Example 31 | 88.19 | 9.83 | 0.09 | 0.07 | 0.47 | 0.74 | 0.25 | 0.29 | 0.05 |
| Example 32 | 88.21 | 9.84 | 0.09 | 0.07 | 0.42 | 0.74 | 0.26 | 0.29 | 0.06 |
| Example 33 | 88.29 | 9.83 | 0.08 | 0.07 | 0.37 | 0.74 | 0.25 | 0.29 | 0.06 |
| Example 34 | 88.31 | 9.83 | 0.08 | 0.07 | 0.36 | 0.74 | 0.26 | 0.28 | 0.05 |
| Example 35 | 88.31 | 9.85 | 0.08 | 0.07 | 0.34 | 0.74 | 0.26 | 0.28 | 0.05 |
| Example 36 | 88.37 | 9.80 | 0.08 | 0.07 | 0.32 | 0.74 | 0.27 | 0.28 | 0.05 |
| Example 37 | 88.37 | 9.82 | 0.09 | 0.07 | 0.28 | 0.74 | 0.26 | 0.29 | 0.06 |
| Example 38 | 88.42 | 9.80 | 0.08 | 0.07 | 0.27 | 0.74 | 0.26 | 0.29 | 0.05 |
| Example 39 | 88.23 | 9.88 | 0.08 | 0.07 | 0.27 | 0.85 | 0.26 | 0.29 | 0.05 |
| Example 40 | 88.18 | 9.97 | 0.07 | 0.06 | 0.25 | 0.90 | 0.25 | 0.26 | 0.05 |
| Comp. Ex. 7 | 88.11 | 9.94 | 0.07 | 0.06 | 0.25 | 1.00 | 0.25 | 0.26 | 0.05 |

TABLE 2-continued

| | | | | | | | | |
|---|---|---|---|---|---|---|---|---|
| Comp. Ex. 8 | 87.99 | 9.96 | 0.07 | 0.06 | 0.25 | 1.10 | 0.25 | 0.26 | 0.05 |
| Comp. Ex. 9 | 87.54 | 9.93 | 0.09 | 0.07 | 0.28 | 1.47 | 0.26 | 0.29 | 0.06 |

| | Oxide Composition | | | Molar | Magnetic Characteristics | | | | Strength |
|---|---|---|---|---|---|---|---|---|---|
| | $La_2O_3$ Mass % | CoO Mass % | $Na_2O$ Mass % | Ratio α | Br mT | Hcl kA/m | Hk/HcJ % | Appearance | σ N/mm² |
| Comp. Ex. 5 | 0.00 | 0.01 | 0.04 | 0.43 | 436.0 | 339.9 | 94.0 | B | 144 |
| Comp. Ex. 6 | 0.00 | 0.01 | 0.03 | 0.48 | 439.0 | 338.8 | 93.7 | A | 151 |
| Example 19 | 0.00 | 0.01 | 0.04 | 0.50 | 440.4 | 327.0 | 93.4 | A | 152 |
| Example 20 | 0.00 | 0.01 | 0.04 | 0.52 | 441.9 | 318.5 | 93.0 | A | 153 |
| Example 21 | 0.00 | 0.02 | 0.06 | 0.59 | 446.3 | 312.0 | 91.5 | A | 155 |
| Example 22 | 0.00 | 0.01 | 0.05 | 0.68 | 447.8 | 313.7 | 91.9 | A | 160 |
| Example 23 | 0.00 | 0.01 | 0.03 | 0.86 | 449.7 | 296.3 | 91.8 | A | 164 |
| Example 24 | 0.00 | 0.01 | 0.05 | 0.93 | 449.2 | 288.9 | 90.8 | A | 165 |
| Example 25 | 0.00 | 0.02 | 0.04 | 1.09 | 448.6 | 292.5 | 90.2 | A | 167 |
| Example 26 | 0.00 | 0.02 | 0.05 | 1.15 | 448.7 | 278.8 | 90.0 | A | 166 |
| Example 27 | 0.00 | 0.01 | 0.04 | 1.21 | 448.8 | 260.4 | 89.1 | A | 165 |
| Example 28 | 0.00 | 0.00 | 0.01 | 1.39 | 449.2 | 210.1 | 88.1 | A | 166 |
| Example 29 | 0.00 | 0.00 | 0.01 | 1.63 | 451.0 | 180.3 | 87.7 | A | 168 |
| Example 30 | 0.00 | 0.01 | 0.01 | 1.86 | 453.9 | 163.2 | 88.0 | A | 171 |
| Example 31 | 0.00 | 0.01 | 0.01 | 2.02 | 459.3 | 160.2 | 88.0 | A | 175 |
| Example 32 | 0.00 | 0.01 | 0.01 | 2.27 | 461.4 | 138.6 | 87.4 | A | 174 |
| Example 33 | 0.00 | 0.01 | 0.01 | 2.54 | 460.5 | 134.7 | 87.0 | A | 175 |
| Example 34 | 0.00 | 0.01 | 0.01 | 2.61 | 460.7 | 132.1 | 86.4 | A | 175 |
| Example 35 | 0.00 | 0.01 | 0.01 | 2.80 | 460.8 | 128.9 | 86.2 | A | 175 |
| Example 36 | 0.00 | 0.01 | 0.01 | 2.87 | 458.9 | 125.6 | 85.5 | A | 175 |
| Example 37 | 0.00 | 0.01 | 0.01 | 3.33 | 458.3 | 125.1 | 86.0 | A | 175 |
| Example 38 | 0.00 | 0.01 | 0.01 | 3.39 | 457.7 | 122.7 | 86.0 | A | 174 |
| Example 39 | 0.00 | 0.01 | 0.01 | 4.04 | 454.4 | 118.9 | 86.0 | A | 171 |
| Example 40 | 0.00 | 0.00 | 0.01 | 4.80 | 450.0 | 101.1 | 85.9 | A | 168 |
| Comp. Ex. 7 | 0.00 | 0.00 | 0.01 | 5.18 | 449.3 | 106.7 | 85.3 | B | 167 |
| Comp. Ex. 8 | 0.00 | 0.00 | 0.01 | 5.68 | 448.0 | 111.0 | 83.0 | B | 166 |
| Comp. Ex. 9 | 0.00 | 0.01 | 0.01 | 6.53 | 439.0 | 110.0 | 69.1 | B | 149 |

As shown in Tables 1 and 2, the sintered ferrite magnets of Examples had no crack, bending strength (σ) of 150 N/mm² or more, residual magnetic flux density (Br) of 440 mT or more, and squareness ratio (Hk/HcJ) of 85% or more. That is, it was confirmed that the sintered ferrite magnets of the invention demonstrated excellent magnetic characteristics when an amount of ZnO and the molar ratio α were within a specific range of values.

Further, in terms of the sintered ferrite magnets of Examples 1 to 40, crystal grains of the Sr ferrite were evaluated. This evaluation was performed as below.

A cross section (a-plane) of the sintered ferrite magnet was mirror-polished and etched with hydrofluoric acid. Then, the resultant etched surface was observed with an FE-SEM. After a contour of crystal grains of the Sr ferrite of the observed image was made clear, a grain size distribution of crystal grains of the Sr ferrite was measured on the number basis by image processing. From grain size distribution data, an average grain size of crystal grains of the Sr ferrite on the number basis and a standard deviation thereof were obtained.

As a result, in all of the sintered ferrite magnets of Examples 1 to 40, the average grain size of crystal grains of the Sr ferrite was 1.0 μm or less, and the standard deviation thereof was 0.42 or less. In addition, a ratio of crystal grains having a grain size of 2.0 μm or more to the entirety of crystal grains of the Sr ferrite was 2% or less on the number basis. Accordingly, it was confirmed that crystal grains of the Sr ferrite contained in the sintered ferrite magnets of Examples 1 to 40 had a sufficiently fine and high uniformity.

NUMERICAL REFERENCES

10 . . . sintered ferrite magnet

The invention claimed is:

1. A sintered ferrite magnet comprising a main phase of an M type Sr ferrite having a hexagonal crystal structure, wherein
an amount of Zn is 0.05 to 1.35 mass % in terms of ZnO, the sintered ferrite magnet does not substantially include a rare-earth element (R), and
the following Formula (1) is satisfied, where a total amount of Sr, Ba and Ca is M3 in terms of mol, a total amount of Fe, Co, Mn, Zn, Cr and Al is M4 in terms of mol, and an amount of Si is M5 in terms of mol, $$0.5 \leq \{M3-(M4/12)\}/M5 \leq 4.8 \quad (1).$$

2. The sintered ferrite magnet as set forth in claim 1, wherein
an amount of Mn is less than 0.5 mass % in terms of MnO.
3. The sintered ferrite magnet as set forth in claim 1, wherein
an amount of Na is 0.01 to 0.09 mass % in terms of $Na_2O$.
4. The sintered ferrite magnet as set forth in claim 2, wherein
an amount of Na is 0.01 to 0.09 mass % in terms of $Na_2O$.
5. The sintered ferrite magnet as set forth in claim 1, wherein
an average grain size of crystal grains of the Sr ferrite is 1.0 μm or less and
a ratio of the crystal grains having a grain size of 2.0 μm or more is 2% or less on the number basis.
6. The sintered ferrite magnet as set forth in claim 1, wherein
a residual magnetic flux density (Br) is 440 mT or more and
a squareness ratio (Hk/HcJ) is 85% or more.
7. A motor, comprising:
the sintered ferrite magnet according to claim 1.

* * * * *